Dec. 11, 1928.

J. BETHENOD

SPEED REGULATOR

Filed June 2, 1923

1,694,637

Inventor
JOSEPH BETHENOD
By his Attorney

Patented Dec. 11, 1928.

1,694,637

UNITED STATES PATENT OFFICE.

JOSEPH BETHENOD, OF PARIS, FRANCE.

SPEED REGULATOR.

Application filed June 2, 1923, Serial No. 642,948, and in France June 27, 1922.

This invention relates to frequency regulation of alternating current machines and particularly to arrangements for maintaining the frequency of an alternating current generator constant by controlling the speed of the driving means in response to slight variations in frequency of the alternating current generator.

One of the principal objects of my invention is the provision of frequency control systems for alternating current generators possessing the following advantages:

(1) Speed control of the driving means independent of the load on the alternating current generator.

(2) Speed control of the driving means responsive only to small frequency variations of the alternating current generator.

(3) Speed control of the driving means responsive to comparatively small frequency variations of the alternating current generator.

(4) Simplicity.

(5) Effectiveness.

Figure 1:
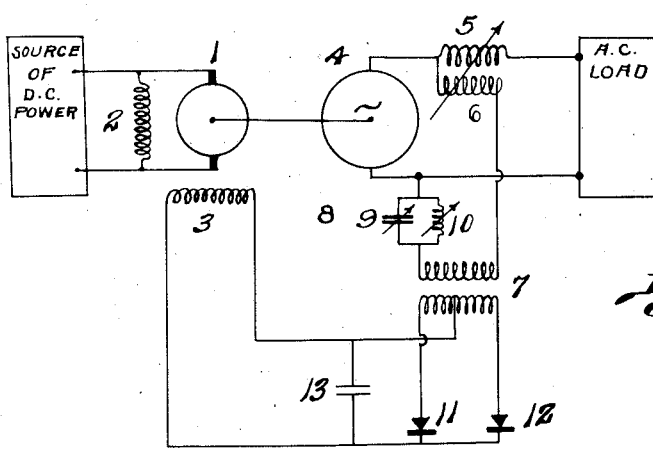
Figure 2:
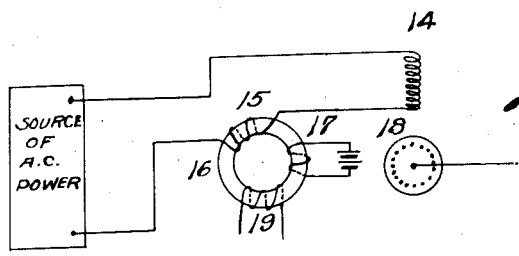

Other objects and advantages of this invention will be apparent from the following description taken in connection with the accompanying drawings in which:

Fig. 1 is a schematic diagram of a preferred modification of the invention, and, Fig. 2 is a schematic diagram of another modification of the invention.

Referring to Fig. 1, a shunt motor 1, comprising a shunt field 2, is connected across a source of direct current power as shown. This motor is also provided with an auxiliary field winding 3 for a purpose to be hereinafter described.

The shunt motor 1 drives the alternating current generator 4 having an alternating current load connected thereto through a coupling coil 5 as shown. A frequency responsive circuit, comprising a coil 6, a primary winding of transformer 7 and a loop or infinite impedance device 8 all connected in series, is connected across the terminals of the alternating current generator 4. The coils 5 and 6 are magnetically coupled in such a manner that the current flowing through the frequency responsive circuit is substantially independent of the load on the generator 4 as explained in detail in French Patent No. 495,514, dated October 19, 1916, to Joseph Bethenod.

This patent discloses in detail the method of compensating for changes in voltage in a supply system by the introduction of a transformer having a substantial amount of magnetic leakage and, if necessary, magnetic saturation in the transformer core. This is equivalent to providing a co-efficient of mutual inductance substantially less than unity and is readily obtained by calculation at the present state of the art.

The infinite impedance device 8 comprises a variable condenser 9 and a variable inductance 10 connected in shunt with each other as shown.

The middle tap of the secondary winding of transformer 7 is connected to one extremity of the auxiliary field winding 3 while the other extremity of the auxiliary field winding 3 is connected to the two extremities of the secondary winding of transformer 7 through two rectifying devices 11 and 12 as shown. Rectifying device 11 rectifies one of the half waves while the rectifying device 12 rectifies the other half waves. The condenser 13 may be connected across the extremities of the auxiliary field winding 3 for ironing out the pulsating rectified currents.

Referring to Fig. 2, a squirrel cage induction motor 14 has its stator winding connected across a source of alternating current power through the coil 15 mounted on the magnetic core 16 of a magnetic modulator. A regulating winding 17 mounted on the core 16 is connected to a source of direct current power 18 for determining the operating point on the saturation curve of the magnetic core 16. An auxiliary winding 19 is also mounted on the core 16. This auxiliary winding may be connected in the same manner as the auxiliary field winding 3 in Fig. 1.

The arrangement shown in Fig. 1 operates in the following manner: Assume that the shunt motor 1 drives the generator 4 which delivers power at the correct frequency to the alternating current load. Now assume that the alternating current load is disconnected or reduced in value and that the shunt motor 1 has a drooping speed characteristic. The motor 1 will now start to increase in speed which will in turn increase the speed of the generator 4 with consequent increase of the frequency of the said generator. The infinite impedance device 8 being adjusted to offer an infinite impedance to a frequency slightly below the desired frequency will now permit a current increase in the primary winding of transformer 7. The current induced in the secondary winding of transformer 7 will be rectified by the rectifiers 11 and 12 and will flow through the auxiliary field winding 3 in such a direction as to cause its ampere turns to boost the ampere turns set up by the shunt winding 2. This will result in an increase of field flux in the motor 1 with a consequent reduction of speed resulting in the frequency of generator 4 being reduced to the desired value. Only a slight increase in frequency of the generator 4 is necessary to bring about the desired regulation of speed of motor 1.

If it is assumed that the generator 4 gives the desired frequency when substantially no load is placed on it and the shunt motor 1 has a drooping characteristic then as the alternating current load increases the speed of the motor 1 will tend to decrease resulting in a decrease in the frequency of generator 4. In this case the infinite impedance device 8 should be tuned to offer infinite impedance to a frequency very slightly above the desired frequency. Therefore as the frequency decreases, a current will flow in the primary winding of transformer 7 which will in turn be rectified as explained above. In this case the auxiliary field winding 3 should be so wound or mounted as to result in its ampere turns bucking the ampere turns set up by the shunt field 2 to thereby cause an increase in the speed of the shunt motor 1 and an increase in the frequency of generator 4 back to the desired value of frequency.

The system shown in Fig. 2 functions in substantially the same manner as that shown in Fig. 1. The winding 19 is arranged to increase or decrease the impedance of the coil 15 to thereby decrease or increase the voltage impressed on the stator winding of induction motor 14, a decrease in voltage resulting in a decrease in speed of the motor and an increase in voltage resulting in an increase in speed.

While I have shown and described various preferred embodiments of my invention I do not limit myself to the same but may employ such other modifications as come within the spirit and scope of my invention.

Having described my invention, what I claim is:

1. In a speed regulating system for alternators, the combination of a high frequency alternator, a shunt circuit connected across said alternator, said circuit comprising an element whose impedance is a function of the alternator frequency and said circuit being inductively linked with the output circuit of said alternator and a rectifier inductively coupled to said shunt circuit.

2. In a speed regulating system, the combination of a high frequency alternator having inductance in its output circuit, a circuit shunted across said output circuit and having inductance therein in inductive relationship to said first mentioned inductance, said shunt circuit having therein a stopping circuit slightly mistuned to the alternator frequency and means comprising a transformer and a rectifier associated with said shunt circuit for supplying a direct current whose value is a function of the alternator frequency.

3. In a speed regulating system, the combination of a high frequency alternator having an inductance coil in its output circuit, a shunt circuit connected across said alternator and having therein an inductance coil coupled with said output circuit inductance coil, said shunt circuit comprising a stopping circuit slightly mistuned to the alternator frequency and a transformer primary, the secondary of the transformer being closed through opposed rectifiers, and a winding connected between a point on the transformer secondary and the common point of said opposed rectifiers.

4. A speed regulating system comprising an alternating current generator, an electric motor for driving said generator, and means for maintaining the generator speed substantially constant, said means comprising a frequency responsive circuit shunted across the generator output, means connected in said circuit to act as a high impedance at the desired generated frequency, current rectifying means coupled to said frequency responsive circuit, and an auxiliary field winding associated with the driving motor connected to said rectifying means, the arrangement being such that any increase or decrease in frequency above or below the desired frequency will cause a direct current to flow in said rectifying means proportional to the alternator frequency.

5. A speed regulating system comprising an alternating current generator, an electric motor for driving said generator, a shunt circuit connected across the terminals of the generator, a rejector circuit slightly mistuned to the alternator frequency and a transformer whose primary is connected in series therewith included in said shunt circuit for passing all frequencies differing from the tuning of the rejector circuit, and means comprising the secondary of said transformer and a rectifier for supplying the motor field with current derived from said rectifier, the value of which varies as a function of the alternator frequency.

JOSEPH BETHENOD.